(12) United States Patent
Zheng et al.

(10) Patent No.: US 11,060,853 B2
(45) Date of Patent: Jul. 13, 2021

(54) THREE-DIMENSIONAL SENSOR SYSTEM AND THREE-DIMENSIONAL DATA ACQUISITION METHOD

(71) Applicant: ScanTech (Hangzhou) Co., Ltd., Hangzhou (CN)

(72) Inventors: Jun Zheng, Hangzhou (CN); Shangjian Chen, Hangzhou (CN)

(73) Assignee: ScanTech (Hangzhou) Co., Ltd., Hangzhou (CN)

( * ) Notice: Subject to any disclaimer, the term of this patent is extended or adjusted under 35 U.S.C. 154(b) by 10 days.

(21) Appl. No.: 16/428,007

(22) Filed: May 31, 2019

(65) Prior Publication Data

US 2019/0353477 A1  Nov. 21, 2019

Related U.S. Application Data

(63) Continuation-in-part of application No. 15/573,487, filed on Nov. 13, 2017, now Pat. No. 10,309,770.

(30) Foreign Application Priority Data

Sep. 14, 2016  (CN) .......................... 201610824489.3

(51) Int. Cl.
    *G01B 11/25*  (2006.01)
    *G06K 9/62*  (2006.01)
    (Continued)

(52) U.S. Cl.
    CPC ........ *G01B 11/2545* (2013.01); *G06K 9/4604* (2013.01); *G06K 9/6202* (2013.01);
    (Continued)

(58) Field of Classification Search
    CPC .................................................. G01B 11/2545
    (Continued)

(56) References Cited

U.S. PATENT DOCUMENTS

| 7,660,458 B1 * | 2/2010 | Saric ...................... G06T 7/593 |
| | | 382/154 |
| 9,674,504 B1 * | 6/2017 | Salvagnini ........... G06K 9/4604 |

(Continued)

FOREIGN PATENT DOCUMENTS

WO     2013145665 A1     10/2013

OTHER PUBLICATIONS

Office Action issued in corresponding Korean Application No. 10-2019-7010317 dated Aug. 19, 2019 (5 pages).

(Continued)

*Primary Examiner* — Tarifur R Chowdhury
*Assistant Examiner* — Omar H Nixon
(74) *Attorney, Agent, or Firm* — Osha Bergman Watanabe & Burton LLP

(57) ABSTRACT

A three-dimensional sensor system includes three cameras, a projector, and a processor. The projector simultaneously projects at least two linear patterns on the surface of an object. The three cameras synchronously capture a first two-dimensional (2D) image, a second 2D image, and a third 2D image of the object, respectively. The processor extracts a first set and a second set of 2D lines from the at least two linear patterns on the first 2D image and the second 2D image, respectively; generates a candidate set of three-dimensional (3D) points from the first set and the second set of 2D lines; and selects, from the candidate set of 3D points, an authentic set of 3D points that matches a projection contour line of the object surface by: performing data verification on the candidate set of 3D points using the third 2D image, and filtering the candidate set of 3D points.

20 Claims, 5 Drawing Sheets

(51) Int. Cl.
*G06K 9/46* (2006.01)
*G06T 7/00* (2017.01)
*G06T 7/593* (2017.01)
*G06T 7/586* (2017.01)

(52) U.S. Cl.
CPC .............. *G06T 7/586* (2017.01); *G06T 7/596* (2017.01); *G06T 7/97* (2017.01); *G06T 2207/10012* (2013.01); *G06T 2207/10028* (2013.01)

(58) Field of Classification Search
USPC ........................................................ 356/603
See application file for complete search history.

(56) References Cited

U.S. PATENT DOCUMENTS

| | | | |
|---|---|---|---|
| 2003/0156260 A1 | 8/2003 | Putilin et al. | |
| 2004/0005092 A1* | 1/2004 | Tomasi ................ | G01B 11/25 382/154 |
| 2005/0166163 A1* | 7/2005 | Chang ................. | G06F 3/0304 715/863 |
| 2008/0013826 A1* | 1/2008 | Hillis ................... | G06F 3/0425 382/154 |
| 2010/0046801 A1* | 2/2010 | Ishiyama ............. | G01C 3/08 382/106 |
| 2010/0141740 A1* | 6/2010 | Munkelt ............. | G01B 11/2509 348/47 |
| 2010/0328243 A1 | 12/2010 | Wang et al. | |
| 2011/0134225 A1* | 6/2011 | Saint-Pierre .......... | G01B 11/25 348/47 |
| 2012/0208098 A1* | 8/2012 | Ohkawara ........... | H01M 8/0662 429/410 |
| 2012/0219699 A1* | 8/2012 | Pettersson ............. | B05B 12/124 427/8 |
| 2012/0263448 A1* | 10/2012 | Winter ................. | H04N 13/246 396/325 |
| 2013/0100282 A1 | 4/2013 | Siercks | |
| 2016/0003612 A1 | 1/2016 | Cirillo et al. | |
| 2016/0202051 A1* | 7/2016 | Heist ................. | G01B 11/2513 356/610 |
| 2017/0067734 A1* | 3/2017 | Heidemann ........ | G01B 11/2545 |

OTHER PUBLICATIONS

Extended European Search Report issued in corresponding EP Application No. 17850048 dated Nov. 29, 2019 (19 pages).

Sing Bing Kang et al: "A multibaseline stereo system with active illumination and real-time image acquisition", Computer Vision, 1995. Proceedings., Fifth International Conference on Cambridge, MA, USA Jun. 20-23, Los Alamitos, CA, USA, IEEE Comput. Soc, US, Jun. 20, 1995 pp. 88-93 (6 pages).

* cited by examiner

THREE-DIMENSIONAL SENSOR SYSTEM AND THREE-DIMENSIONAL DATA ACQUISITION METHOD

CROSS REFERENCE TO RELATED APPLICATIONS

This application is a continuation-in-part application of U.S. patent application Ser. No. 15/573,487, which is the national phase entry of International Application PCT/CN2017/086258, filed on May 27, 2017, which is based upon and claims priority to Chinese Patent Application No. CN 201610824489.3, filed on Sep. 14, 2016, the entire contents of which are incorporated herein by reference.

TECHNICAL FIELD

The present invention relates to the field of three-dimensional scanning, and more particularly to a three-dimensional sensor system and a three-dimensional data acquisition method.

BACKGROUND

Currently, the optical three-dimensional scanning technology is gradually used in a variety of fields such as industry, archaeology, medical treatment, and teaching etc. The triangulation method is the most popular method due to a wide range of applications, high accuracy, and a cost-effective performance. The existing products that use the triangulation principle includes laser distance-measuring sensors, three-dimensional contour sensors, three-coordinate instrument laser probe, handheld laser three-dimensional scanner, handheld projection three-dimensional scanner, fixed projection three-dimensional scanner, etc.

A common method to implement triangulation is to project a single linear pattern by laser or pattern projector. The principle of this method is relatively simple. Given the premise that the location of light planes emitted by the pattern projector and the location of the camera are known, the photosensitive element of camera captures a projection linear pattern on the image. The points on the projection linear pattern are connected to the optical center of the camera. The intersection points of the connection line and the light planes projected by the pattern projector are the desired three-dimensional points on the surface of the scanned object. The triangulation method has the advantages of high scanning accuracy, fast scanning speed, uncomplicated hardware, and high cost performance Thus, the triangulation method is widely used in the occasions of close-distance contactless scanning. However, generally, the scanner or three-dimensional sensor that uses the triangulation method only project one linear pattern. If a plurality of linear patterns are simultaneously projected, there will be a mismatch of the image, so the effective three-dimensional data cannot be obtained. Therefore, the point-determining speed of the traditional scanner or three-dimensional sensor that uses the triangulation method is greatly restricted, and is not satisfactory for the occasions that require high scanning speed.

SUMMARY OF THE INVENTION

Regarding the drawbacks of the prior art, the present invention aims to provide a three-dimensional sensor system that uses a multiple-linear-pattern projection manner, and has a high point-determining efficiency and fast scanning speed.

In order to realize the above objectives, the technical solution of the present invention is as follows.

A three-dimensional sensor system includes at least one pattern projector, at least two cameras, a two-dimensional image feature extractor, a three-dimensional point-cloud generator, and a three-dimensional point-cloud verifier.

The pattern projector is configured to project at least two linear patterns simultaneously.

The at least two cameras are configured to capture a two-dimensional image of a scanned object simultaneously.

The two-dimensional image feature extractor is configured to extract a two-dimensional line set of the at least two linear patterns on a surface of a scanned object on a two-dimensional image.

The three-dimensional point-cloud generator is configured to generate a candidate three-dimensional point set based on the two-dimensional line set.

The three-dimensional point-cloud verifier is configured to select an authentic three-dimensional point set that correctly matches with a projection contour line on a surface of the object from the candidate three-dimensional point set.

As a further improvement of the present invention, the two-dimensional image feature extractor is configured to extract a two-dimensional line set of the at least two linear patterns on a surface of a scanned object on a two-dimensional image. Specifically, the two-dimensional image feature extractor performs a distortion correction on the two-dimensional image according to an internal parameter of a camera corresponding to the two-dimensional image. A connected region of a line contour in a corrected image is extracted according to a pixel gray-level difference. The two-dimensional line set of a highlight center with a sub-pixel level is calculated according to a gray-level centroid of the connected region.

As a further improvement of the present invention, the three-dimensional point-cloud generator is configured to generate a candidate three-dimensional point set based on the two-dimensional line set. Specifically, the three-dimensional point-cloud generator extracts two-dimensional point data from the two-dimensional line sets of at least two synchronous two-dimensional images respectively. The candidate three-dimensional point set is calculated according to the principles of triangulation and epipolar constraints based on a correlation between the spatial location of the cameras.

The three-dimensional point-cloud verifier is configured to select an authentic three-dimensional point set that correctly matches with a projection contour line on a surface of the object from the candidate three-dimensional point set. Specifically, the three-dimensional point-cloud verifier determines whether a point belongs to the authentic three-dimensional point set based on whether the point in the candidate three-dimensional point set is located in a certain three-dimensional light plane projected by the pattern projector and performs a selection to obtain the authentic three-dimensional point set.

As a further improvement of the present invention, the three-dimensional point-cloud verifier determines whether a point belongs to the authentic three-dimensional point set based on whether the point in the candidate three-dimensional point set is located in a certain three-dimensional light plane projected by the pattern projector and performs a selection to obtain the authentic three-dimensional point set. Specifically, the candidate three-dimensional point set includes a plurality of sub-sets. On the basis of distances between the sub-sets and the three-dimensional light plane, a sub-set having a minimum distance value is selected by the three-dimensional point-cloud verifier as the authentic three-dimensional point set.

As a further improvement of the present invention, at least three cameras are provided.

The three-dimensional point-cloud generator is configured to generate the candidate three-dimensional point set based on the two-dimensional line set. Specifically, the three-dimensional point-cloud generator extracts the two-dimensional point data from the two-dimensional line sets of two synchronous two-dimensional images respectively. The candidate three-dimensional point set is calculated according to the principles of triangulation and epipolar constraints based on the correlation between the spatial location of the two cameras corresponding to the two synchronous two-dimensional images.

The three-dimensional point-cloud verifier is configured to select the authentic three-dimensional point set that correctly matches with a projection contour line on the surface of the object from the candidate three-dimensional point set. Specifically, the three-dimensional point-cloud verifier uses the two-dimensional image shot by a third camera or more cameras to perform a data verification on the candidate three-dimensional point set and to select the authentic three-dimensional point set.

As a further improvement of the present invention, the three-dimensional point-cloud verifier uses the two-dimensional image shot by a third camera or more cameras to perform a data verification for the candidate three-dimensional point set and to select the authentic three-dimensional point set. Specifically, the candidate three-dimensional point set includes a plurality of sub-sets. A connection line between the subset and a photocenter of the third camera has an intersection point set with respect to the two-dimensional image shot by the third camera. On the basis of distances between the intersection point set and the two-dimensional line on the two-dimensional image shot by the third camera, a sub-set corresponding to a minimum distance value is selected by the three-dimensional point-cloud verifier as the authentic three-dimensional point set.

As a further improvement of the present invention, the three-dimensional point-cloud generator is configured to generate a candidate three-dimensional point set based on the two-dimensional line set. Specifically, the three-dimensional point-cloud generator extracts two-dimensional point data from the two-dimensional line set of an image shot by any camera. The candidate three-dimensional point set is obtained according to the principles of triangulation based on a correlation between the spatial location of a plurality of spatial light planes projected by the pattern projector and the camera.

The three-dimensional point-cloud verifier is configured to select an authentic three-dimensional point set that correctly matches with a projection contour line on the surface of the object from the candidate three-dimensional point set. Specifically, the three-dimensional point-cloud verifier verifies the candidate three-dimensional point set with an image shot by at least one other camera and performs a selection to obtain the authentic three-dimensional point set.

As a further improvement of the present invention, the three-dimensional point-cloud verifier verifies the candidate three-dimensional point set with an image shot by at least one other camera and performs a selection to obtain the authentic three-dimensional point set. Specifically, the candidate three-dimensional point set includes a plurality of sub-sets. A connection line between the subset and a photocenter of the at least one other camera has an intersection point set with respect to an image shot by the at least one other camera. On the basis of distances between the intersection point set and the two-dimensional line on the image shot by the at least one other camera, a sub-set corresponding to a minimum distance value is selected by the three-dimensional point-cloud verifier and the sub-set corresponding to the minimum distance value is the authentic three-dimensional point set.

As a further improvement of the present invention, the linear pattern is projected by one pattern projector or by a plurality of pattern projectors synchronously. The linear pattern is a straight line or a curved line.

As a further improvement of the present invention, the pattern projector includes a linear laser and a DOE beam splitting element. The linear laser produces a plurality of laser line segments through the DOE beam splitting element.

As a further improvement of the present invention, the pattern projector includes a projector. The projector projects the at least two linear patterns directly.

As a further improvement of the present invention, the three-dimensional sensor system includes a synchronizing trigger. The synchronizing trigger is used to trigger the camera and the pattern projector to operate synchronously.

A three-dimensional data acquisition method includes the following steps:

projecting, by a pattern projector, at least two linear patterns;

capturing, synchronously by at least two cameras, a two-dimensional image;

extracting a two-dimensional line set of at least two linear patterns on a surface of a scanned object on a two-dimensional image;

generating an candidate three-dimensional point set based on the two-dimensional line set;

selecting an authentic three-dimensional point set that correctly matches with a projection contour line on the surface of the object from the candidate three-dimensional point set.

As a further improvement of the present invention, extracting a two-dimensional line set on a two-dimensional image of at least two linear patterns on a surface of a scanned object specifically includes performing a distortion correction for the two-dimensional image according to an internal parameter of the camera corresponding to the two-dimensional image, extracting a connected region of a line contour in a corrected image according to a pixel gray-level difference, and calculating the two-dimensional line set of a highlight center with a sub-pixel level according to a gray-level centroid of the connected region.

As a further improvement of the present invention, generating a candidate three-dimensional point set based on the two-dimensional line set specifically includes extracting two-dimensional point data from the two-dimensional line sets of at least two synchronous two-dimensional images respectively, and obtaining the candidate three-dimensional point set by a calculation according to the principles of triangulation and epipolar constraints based on a correlation between the spatial location of the cameras.

Selecting an authentic three-dimensional point set that correctly matches with a projection contour line on the surface of the object from the candidate three-dimensional point set specifically includes determining whether a point belongs to the authentic three-dimensional point set based on whether the point in the candidate three-dimensional point set is located in a certain three-dimensional light plane projected by the pattern projector and performing a selection to obtain the authentic three-dimensional point set.

As a further improvement of the present invention, whether a point belongs to the authentic three-dimensional point set is determined based on whether the point in the candidate three-dimensional point set is located in a certain three-dimensional light plane projected by the pattern projector and a selection is performed to obtain the authentic three-dimensional point set. Specifically, the candidate three-dimensional point set includes a plurality of sub-sets, and on the basis of distances between the sub-sets and the three-dimensional light plane, a sub-set with a minimum distance value is selected, and the sub-set with a minimum distance value is the authentic three-dimensional point set.

As a further improvement of the present invention, at least three cameras are provided.

Generating an candidate three-dimensional point set based on the two-dimensional line set specifically includes extracting two-dimensional point data from the two-dimensional line sets of two synchronous two-dimensional images respectively, and obtaining the candidate three-dimensional point set by a calculation according to the principles of triangulation and epipolar constraints based on a correlation between the spatial location of the two cameras corresponding to the two synchronous two-dimensional images.

Selecting an authentic three-dimensional point set that correctly matches with a projection contour line on a surface of the object from the candidate three-dimensional point set specifically includes using a two-dimensional image shot by a third camera or more cameras to perform a data verification for the candidate three-dimensional point set and selecting the authentic three-dimensional point set.

As a further improvement of the present invention, the two-dimensional image shot by a third camera or more cameras is used to perform a data verification for the candidate three-dimensional point set and the authentic three-dimensional point set is selected. Specifically, the candidate three-dimensional point set includes a plurality of sub-sets. A connection line between the subset and a photocenter of the third camera has an intersection point set with respect to the two-dimensional image shot by the third camera. On the basis of distances between the intersection point set and the two-dimensional line on the two-dimensional image shot by the third camera, a sub-set corresponding to a minimum distance value is selected as the authentic three-dimensional point set.

As a further improvement of the present invention, generating a candidate three-dimensional point set based on the two-dimensional line set specifically includes extracting the two-dimensional point data from the two-dimensional line set of an image shot by any camera, and obtaining the candidate three-dimensional point set according to the principles of triangulation based on a correlation between the spatial location of a plurality of spatial light planes projected by the pattern projector and the camera.

Selecting an authentic three-dimensional point set that correctly matches with a projection contour line on a surface of the object from the candidate three-dimensional point set specifically includes verifying the candidate three-dimensional point set with an image shot by at least one other camera and selecting the authentic three-dimensional point set.

As a further improvement of the present invention, the candidate three-dimensional point set is verified with an images shot by at least one other camera and the authentic three-dimensional point set is selected. Specifically, the candidate three-dimensional point set includes a plurality of sub-sets. A connection line of the subset and a photocenter of the at least one other camera has an intersection point set with respect to the image shot by the at least one other camera. On the basis of distances between the intersection point set and the two-dimensional line on the image shot by the at least one other camera, a sub-set corresponding to a minimum distance value is selected as the authentic three-dimensional point set.

Compared with the prior art, the advantages of the present invention areas follows.

Since the three-dimensional sensor system uses a projection manner in which a plurality of linear patterns are projected, the three-dimensional sensor system can recognize the plurality of linear patterns that are synchronously projected and calculate the three-dimensional point-cloud data on the surface of the object. Thus, the efficiency of point-determining is several times higher than the traditional single-line scanning. The scanning speed is significantly improved.

The foregoing illustrations are merely an overall description of the technical solution of the present invention. In order to make the technical solution of the present invention clearly understood, to implement the present invention in accordance with the description of the specification, and to make the above or other objectives, features, advantages of the present invention apparent and understandable, the preferred embodiments are provided along with the drawings and described in detail hereinafter.

Figure 1:
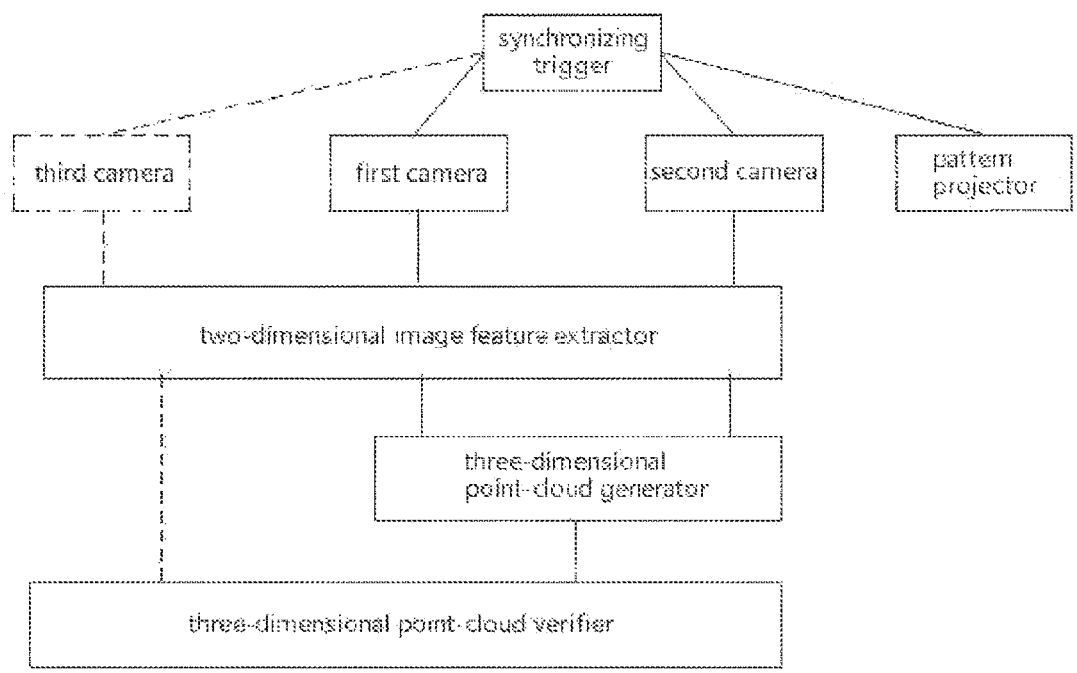
FIG. 1 is a schematic diagram of a three-dimensional sensor system according to an embodiment of the present invention.

Description of reference numerals is as follows. 100. object; 210. pattern projector; 220. first camera; 221. first image; 230. second camera; 231. second image; 240. third camera; 241. third image; 310. pattern projector; 320. first camera; 321. first image; 330. second camera; 331. second image; 410. first camera; 411. first image; 420. second camera; 421. second image; 430. third camera; 431. third image; 510. pattern projector; 520. first camera; 521. first image; 530. second camera; 531. second image.

DETAILED DESCRIPTION OF THE INVENTION

The present invention will be described in detail hereinafter with reference to the drawings and specific embodiments.

FIG. 1 is a schematic diagram of a three-dimensional sensor system according to an embodiment of the present invention. The three-dimensional sensor system includes a first camera, a second camera, a third camera, a synchronous trigger, a pattern projector, and a processor that includes a two-dimensional image extractor and a three-dimensional point-cloud generator. It should be noted that the number of cameras is at least two, and the number of pattern projectors is at least one. The numbers of cameras and pattern projectors are not limited thereto. The main operation procedure of the three-dimensional sensor system is as follows.

Step 1, at least two linear patterns are projected by the pattern projector.

The linear patterns may be projected by one pattern projector, or synchronously projected by a plurality of pattern projectors, directly or indirectly. The linear patterns may each be a straight line or a curved line. The pattern projector may include a linear laser and a diffractive optical element (DOE) beam splitting element. A plurality of laser line segments may be produced by the linear laser through the DOE beam splitting element.

Step 2, at least two cameras synchronously capture a two-dimensional image of a scanned object.

Step 1 and step 2 may be performed synchronously. Specifically, the exposure of the first camera and the second camera may be triggered by the synchronous trigger while the pattern projector is triggered by the synchronous trigger. The two frames of image respectively captured by the two cameras are output to the two-dimensional image extractor for feature extraction.

Step 3, the two-dimensional image feature extractor extracts a first set of two-dimensional lines and a second set of two-dimensional lines, from the at least two linear patterns on each of the first two-dimensional image and the second two-dimensional image. The two-dimensional image feature extractor may also extract a third set of two-dimensional lines from the at least two linear patterns on the third two-dimensional image.

After the two-dimensional image extractor performs a distortion correction on the image according to an internal parameter of a camera corresponding to the two-dimensional image, a connected region of a line contour with high gray-level in a corrected image is extracted according to a pixel gray-level difference. Next, the two-dimensional line set of a highlight center with a sub-pixel level is calculated according to a gray-level centroid of the connected region. Moreover, the obtained two-dimensional line set is output to the three-dimensional point cloud generator.

Step 4, the three-dimensional point-cloud generator generates a candidate set of three-dimensional points based on the first set of two-dimensional lines and/or the second set of two-dimensional lines.

Step 5, the three-dimensional point-cloud verifier selects an authentic set of three-dimensional points that correctly matches the projection counter line on the surface of the object from the candidate set of three-dimensional points.

For example, step 4 and step 5 may be implemented by three methods presented as follows.

The first method is that the three-dimensional point-cloud generator extracts two-dimensional point data from the two-dimensional line sets of at least two synchronous two-dimensional images respectively. The candidate three-dimensional point set is calculated according to the principles of triangulation and epipolar constraints based on a correlation between the spatial location of the cameras. The three-dimensional point-cloud verifier determines whether a point belongs to the authentic three-dimensional point set based on whether the point in the candidate three-dimensional point set is located in a certain three-dimensional light plane projected by the pattern projector. A selection is performed to obtain the authentic three-dimensional point set.

The candidate three-dimensional point set may include a plurality of sub-sets. On the basis of distances between the sub-sets and the three-dimensional light plane, the three-dimensional point-cloud verifier selects a sub-set having a minimum distance value as the authentic three-dimensional point set.

The second method is that the three-dimensional point-cloud generator extracts the two-dimensional point data from the two-dimensional line sets of two synchronous two-dimensional images respectively. The candidate three-dimensional point set is calculated according to the principles of triangulation and epipolar constraints based on a correlation between the spatial location of the two cameras corresponding to the two synchronous two-dimensional images. The three-dimensional point-cloud verifier uses the two-dimensional images shot by a third camera or other cameras to perform a data verification on the candidate three-dimensional point set. A selection is performed to obtain the authentic three-dimensional point set.

The candidate three-dimensional point set may include a plurality of sub-sets. A connection line between the subset and a photocenter of the third camera has an intersection point set with respect to the two-dimensional image shot by the third camera. On the basis of distances between the intersection point set and the two-dimensional line on the two-dimensional image shot by the third camera, a sub-set corresponding to a minimum distance value is selected by the three-dimensional point-cloud verifier as the authentic three-dimensional point set.

The third method is that the three-dimensional point-cloud generator extracts two-dimensional point data from the two-dimensional line set of an image shot by any camera. The candidate three-dimensional point set is obtained according to the principles of triangulation based on a correlation between the spatial location of a plurality of spatial light planes projected by the pattern projector and the camera. The three-dimensional point-cloud verifier verifies the candidate three-dimensional point set with an image shot by at least one other camera and filters the candidate three-dimensional point set to obtain the authentic three-dimensional point set.

The candidate three-dimensional point set may include a plurality of sub-sets. A connection line between the subset and a photocenter of the at least one other camera has an intersection point set with respect to an image shot by the at least one other camera. On the basis of distances between the intersection point set and the two-dimensional line on the image shot by at least another camera, a sub-set corresponding to a minimum distance value is selected by the three-dimensional point-cloud verifier as the authentic three-dimensional point set.

Figure 2:
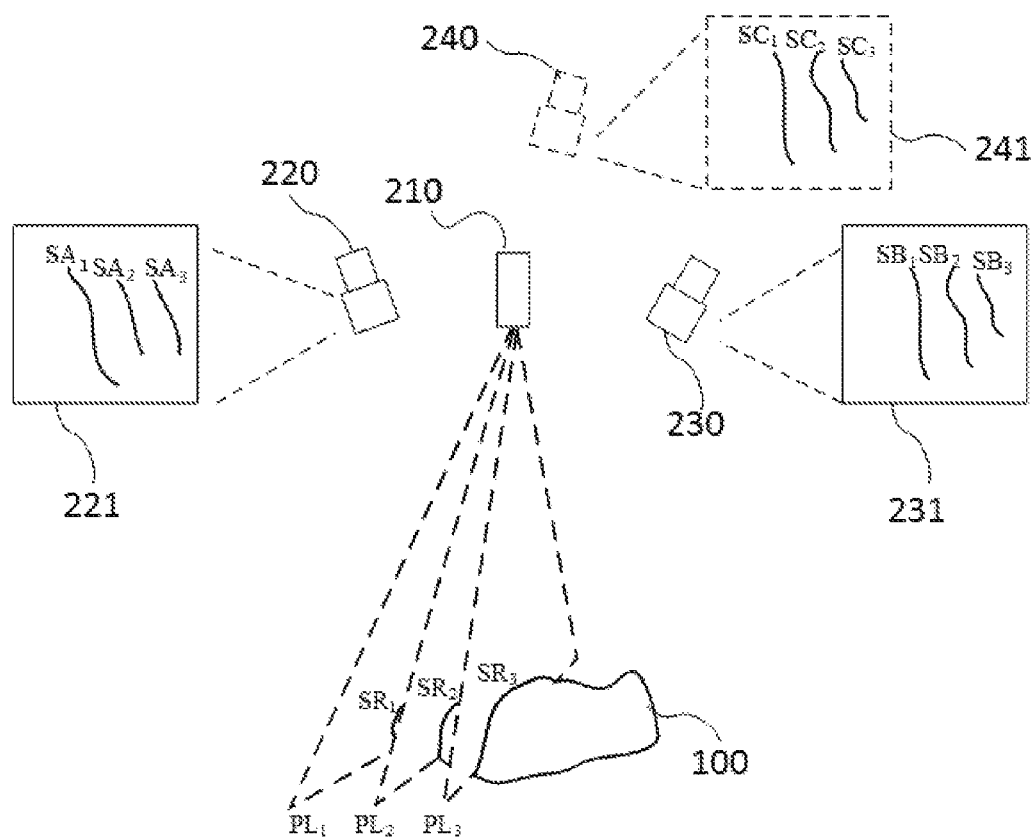
FIG. 2 is a schematic diagram of pattern projection and image capturing of the three-dimensional sensor system according to an embodiment of the present invention.

In order to make the above three methods more understandable, examples are provided hereinafter. Firstly, FIG. 2 is a schematic diagram of the pattern projection and image capturing of the three-dimensional sensor system according to an embodiment of the present invention. In FIG. 2, an example is taken wherein there are three cameras with known spatial location correlation and a pattern projector which can synchronously project three linear patterns. Specifically, a three-dimensional sensor system includes pattern projector 210, first camera 220, first image 221, second camera 230, second image 231, third camera 240, and third image 241. The specific steps to generate a set of two-dimensional lines are as follows.

S1, pattern projector 210 projects three light planes $PL_1$, $PL_2$, and $PL_3$. Three three-dimensional spatial lines $SR_1$, $SR_2$ and $SR_3$ are formed on the surface of object 100 by the light planes. First camera 220 and second camera 230 synchronously capture a two-dimensional image. First camera 220 and second camera 230 captures first image 221 and second image 231 respectively. First image 221 and second image 231 each includes a plurality of linear patterns which constitute a part of linear patterns on the surface of object 100. The linear patterns are presented on the two-dimensional images in the form of two-dimensional lines including $SA_1$, $SA_2$, $SA_3$ and $SB_1$, $SB_2$, $SB_3$.

S2, all two-dimensional lines $SA_1$, $SA_2$, $SA_3$ and $SB_1$, $SB_2$, $SB_3$ are extracted from first image 221 and second image 231 respectively. Given that the internal parameters of the camera are known, firstly, an image distortion correction is performed according to the internal parameters of the corresponding camera. The connected region of the line counter with high gray-level of the image is extracted according to the gray-level difference of pixels obtained by column traversal statistic. The two-dimensional line of a highlight center with a sub-pixel level is calculated according to a gray-level centroid of the connected region to obtain a two-dimensional line set.

Three methods of generating a candidate three-dimensional point set based on the two-dimensional line set and selecting an authentic three-dimensional point set from the candidate three-dimensional point set are described through three specific embodiments. Each of the three embodiments is based on the two-dimensional line set obtained by the three-dimensional sensor system shown in FIG. 2. Each of the three embodiments correspond to one of the three methods of obtaining the authentic three-dimensional point set mentioned above respectively.

Figure 3:
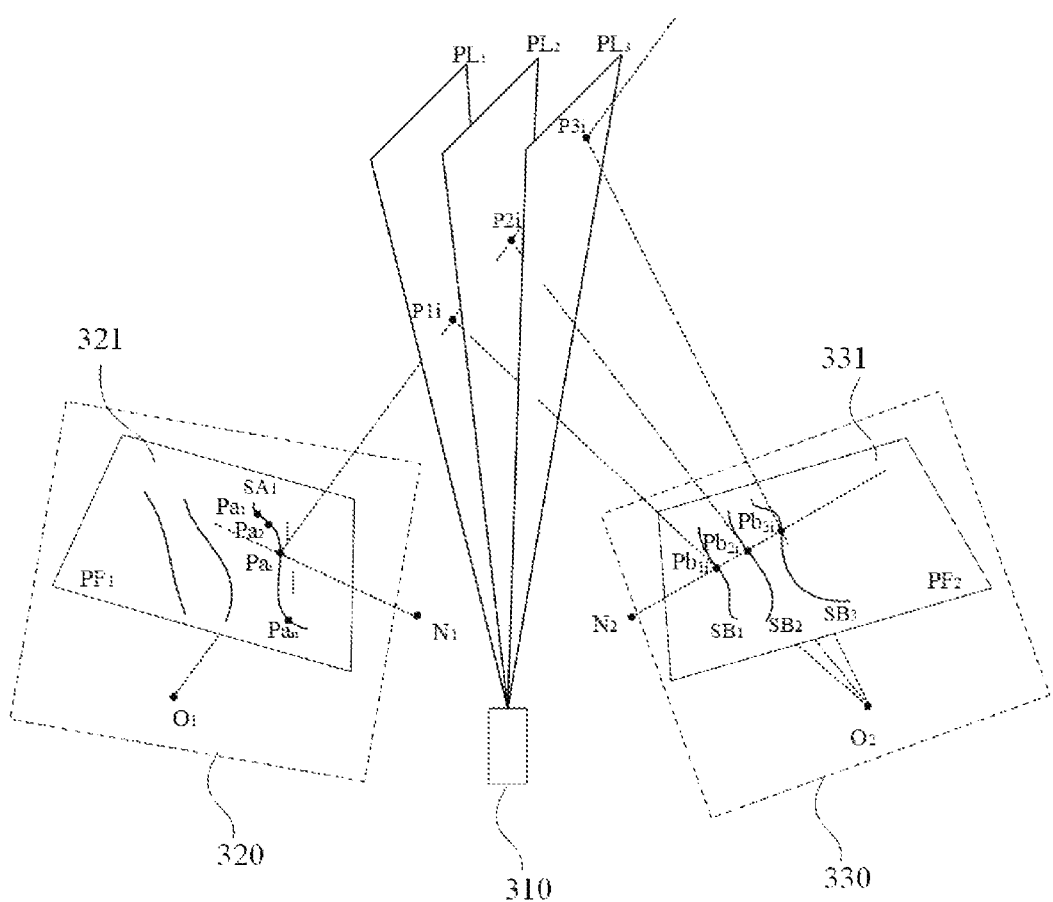
FIG. 3 is a schematic diagram of a method for obtaining an authentic three-dimensional point set according to the first embodiment of the present invention.

FIG. 3 is a schematic diagram of a method for obtaining an authentic three-dimensional point set according to the first embodiment of the present invention. The schematic diagram contains pattern projector 310, first camera 320, first image 321, second camera 330, and second image 331. Pattern projector 310 projects three light planes $PL_1$, $PL_2$, and $PL_3$. First camera 320 and second camera 330 synchronously capture the two-dimensional image. First camera 320 and second camera 330 capture first image 321 and second image 331 respectively. $O_1$ and $O_2$ are the photocenters of first camera 320 and second camera 330 respectively. The internal and external parameters of the cameras are given.

The method includes the following steps.

3.1, first image 321 and second image 331 include a plurality of linear patterns which constitute a part of linear patterns on the surface of object 100. The linear patterns are presented in the form of two-dimensional lines on the two-dimensional image, such as two-dimensional line $SA_1$ in first image 321, wherein $Pa_i$ is a two-dimensional point on the two-dimensional line $SA_1$. The internal parameter $M_A$ of first camera 320 and the internal parameter $M_B$ of the second camera 330 are given, and the external parameter RT of first camera 320 with respect to second camera 330 is given. An Essential Matrix E=RS can be calculated according to the external parameter RT of first camera 320 with respect to second camera 330, wherein R is the rotation matrix and T is the translation vector, $$S = \begin{bmatrix} 0 & -T_z & T_y \\ T_z & 0 & -T_x \\ -T_y & T_x & 0 \end{bmatrix} \cdot A$$

Fundamental Matrix $F=(M_A^{-1})^T E(M_B^{-1})$ can be obtained by internal parameters $M_A$ and $M_B$ of the two cameras. According to the principle of epipolar constraints, $(Xa_i, Ya_i, 1)^T F(x, y, 1)=0$ is satisfied, wherein $(Xa_i, Ya_i)$ is the coordinate of point $Pa_i$, (x,y) is a two-dimensional coordinate of a point located on an epipolar line. After the epipolar line is obtained ($N_1$, $N_2$ are the epipolar points), an intersection point set $\{Pb_{1i}, Pb_{2i}, Pb_{3i}\}$ of the epipolar line intersecting with each of the two-dimensional lines on second image 331 can be obtained.

3.2, the three-dimensional points of two-dimensional point $Pa_i$ on first image 320 are calculated according to each point in the intersection point set $\{Pb_{1i}, Pb_{2i}, Pb_{3i}\}$ by the triangular principle. Since the triangular principle is a common sense, the details of the triangular principle will not be described herein. These three-dimensional points is the set of all possible three-dimensional points corresponding to the two-dimensional point $Pa_i$, i.e. the candidate three-dimensional point set $Mi=\{P_{1i}, P_{2i}, P_{3i}\}$. The method to calculate the three-dimensional point coordinate is described below. First image 321 captured by first camera 320 is imaged on a photosensitive element plane $PF_1$. Second image 331 captured by second camera 330 is imaged on a photosensitive element plane $PF_2$. $L_1$ is a spatial connection line between point $Pa_i$ on the two-dimensional line $SA_1$ and photocenter $O_1$ of first camera 320. $L_2$ is a spatial connection line between point $Pb_{1i}$ on the two-dimensional line $SB_1$ on second image 331 and photocenter $O_2$ of second camera 330. $L_1$ and $L_2$ intersects at a spatial point $P_{1i}$ which is one of the candidate three-dimensional points corresponding to the calculated point $Pa_i$. If the spatial straight lines do not intersect with each other, a mid-point of an intersection line segment on a common perpendicular of the two spatial lines is used as a candidate three-dimensional point. Similarly, the three candidate three-dimensional points $P_{1a}$, $P_{2i}$, and $P_{3i}$ of point $Pa_i$ can be calculated. It is apparent that only one point in the three candidate three-dimensional points of point $Pa_i$ is authentic.

3.3, steps 3.1 and 3.2 are repeated to calculate the corresponding candidate three-dimensional points of other points on two-dimensional line $SA_1$ on first image 321 by same method.

3.4. Since many points in the candidate three-dimensional point set do not belong the authentic three-dimensional point set, a selection and a verification is necessary. Under the condition that the three-dimensional position calibration of the plurality of three-dimensional light plane projected by the pattern projector and the camera are known, the three-dimensional light planes and all the candidate three-dimensional point sets obtained from first image 321 and second image 331 are converted to the same coordinate system. $\{\{P_{1i}|1 \leq i \leq n\}, \{P_{2i}|1 \leq i \leq n\}, \{P_{3i}|1 \leq i \leq n\}\}$ are all candidate three-dimensional point sets corresponding to the two-dimensional point set $\{Pa_i|1 \leq i \leq n\}$ on the two-dimensional line $SA_1$ on first image 321, wherein each two-dimensional line on second image 331 corresponds to one subset, for example, $SB_1$ corresponds to $\{P_{1i}|1 \leq i \leq n\}$. The location relationships between each subset in the candidate three-dimensional point set and the three light planes are recorded respectively. A sum of distances between each point in the sub-set and the three light planes is used as a criterion for the selection:

$$W_k = \sum_{i=1}^{n} (D(PL_k, P_{ji})),$$

wherein $D(PL_k, P_{ji})$ is the distance from a candidate three-dimensional point $P_{ji}$ corresponding to two-dimensional line $SB_j$ to a certain light plane $PL_k$. After the minimum value $W_m=\min(W_k|k=1, 2, 3)$ is selected, $P_{ji} \in PL_m$ is subsequently determined. That is, the three-dimensional point set $\{Pm_i|1\leq i\leq n\}$ on light plane $PL_m$ is the authentic three-dimensional point set corresponding to two-dimensional line $SA_1$ on first image 321. In other words, the authentic three-dimensional counter line projected to the surface of object 100 by light plane $PL_m$ is imaged as two-dimensional line $SA_1$ on first camera 320, and as two-dimensional line $SB_j$ on second camera 330.

Figure 4:
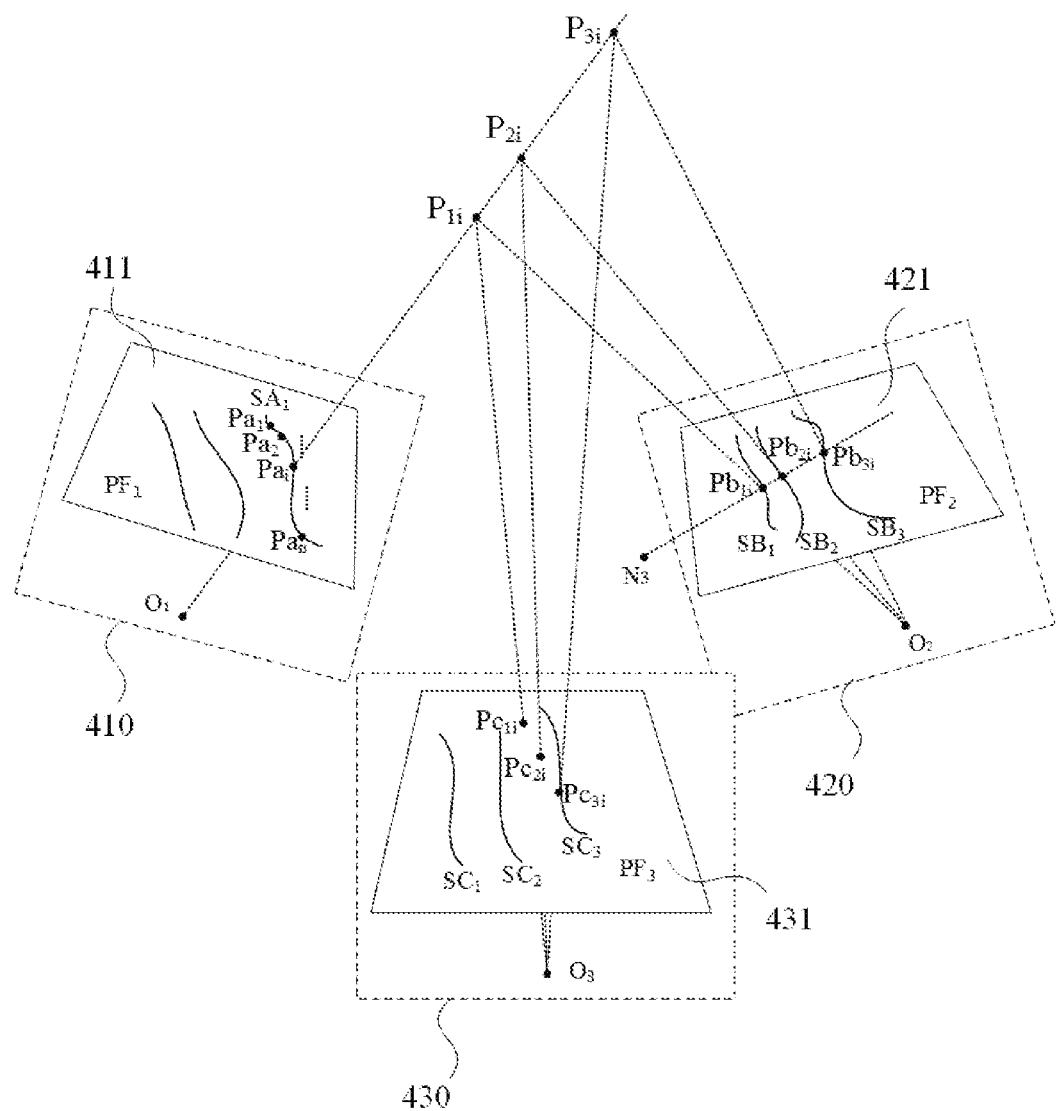
FIG. 4 is a schematic diagram of a method for obtaining an authentic three-dimensional point set according to the second embodiment of the present invention.

FIG. 4 is a schematic diagram of a method for obtaining an authentic three-dimensional point set according to the second embodiment of the present invention. The schematic diagram contains first camera 410, first image 411, second camera 420, second image 421, third camera 430, third image 431, and a pattern projector (not shown in the drawing).

The two-dimensional image captured by first camera 410 is first image 411. The two-dimensional image captured by second camera 420 is second image 421. The two-dimensional image captured by third camera 430 is third image 431. First image 411 captured by first camera 410 is imaged on a photosensitive element plane $PF_1$. Second image 421 captured by second camera 420 is imaged on a photosensitive element plane $PF_2$. Third image 431 captured by third camera 430 is imaged on a photosensitive element plane $PF_3$. $O_1$, $O_2$, and $O_3$ are the photocenters of first camera 410, second camera 420, and third camera 430 respectively. The internal and external parameters of the cameras are known.

Under the conditions that three or more cameras are provided and the internal and external parameters of the camera are known, the data verification can be performed by the third or other cameras. The system is not required to calibrate the spatial location correlation between the camera and the plurality of light planes projected by the pattern projector. Rather, the three-dimensional points in the obtained candidate three-dimensional point set are verified by the third camera to output the authentic three-dimensional point set.

The specific method is as follows.

4.1, The two-dimensional line set on third image 431 is obtained as $\{SC_1, SC_2, SC_3\}$ according to the method described in step S2. The three candidate three-dimensional points $P_{1i}$, $P_{2i}$, and $P_{3i}$ corresponding to a point $Pa_i$ on the two-dimensional line $SA_1$ on first image 411 are calculated according to the method described in step 3.2. The three candidate three-dimensional points $P_{31}$, $P_{2i}$ and $P_{3i}$ are connected to a photocenter $O_3$ of third camera 430 respectively. The connection lines intersect with a focal plane $PF_3$ of the third camera (i.e. third image 431) at three points $Pc_{1i}$, $Pc_{2i}$ and $Pc_{3i}$. It is apparent that only one of the three points is the image of the authentic three-dimensional point. Similarly, $\{\{P_{1i}|1\leq i\leq n\}, \{P_{2i}|1\leq i\leq n\}, \{P_{3i}|1\leq i\leq n\}\}$ are all the candidate three-dimensional point sets corresponding to the two-dimensional point set $\{Pa_i|1\leq i\leq n\}$ on the two-dimensional line $SA_1$ on first image 311, wherein each subset corresponds to a two-dimensional line on second image 321. For example, the two-dimensional line $SB_1$ corresponds to the subset $\{P_{1i}|1\leq i\leq n\}$.

4.2, Each point in the candidate three-dimensional point set $\{\{P_{1i}|1\leq i\leq n\}, \{P_{2i}|1\leq i\leq n\}, \{P_{3i}|1\leq i\leq n\}\}$ is connected to the photocenter $O_3$ of third camera 430. The intersection point sets of the connection lines and third image 431 on a photosensitive element $PF_3$ is $\{\{Pc_{1i}|1\leq i\leq n\}, \{Pc_{2i}|1\leq i\leq n\}, \{Pc_{3i}|1\leq i\leq n\}\}$. The location relationships between each sub-set in the intersection point set and the three two-dimensional lines $\{SC_1, SC_2, SC_3\}$ on third image 431 are recorded respectively. A sum of distances between each point in the recorded sub-set and a certain two-dimensional line $SC_k$ is used as a criterion for the selection:

$$Wk = \sum_{i=1}^{n} (D(SC_k, Pc_{ji})).$$

An epipolar line ($N_3$ is the epipolar point) is calculated according to epipolar constraint principle based on the point set $\{Pa_i|1\leq i\leq n\}$ on the two-dimensional line $SA_1$ on first image 411. The candidate three-dimensional points corresponding to the intersection point set of the epipolar line intersecting with two-dimensional line $SB_j$ is the intersection point set $\{Pc_j|1\leq i\leq n\}$ on third image 431 intersecting with the connection lines between $P_{ji}$ and the photocenter $O_3$ of third camera 430. The distances from point set $\{Pc_{ji}|1\leq i\leq n\}$ to two-dimensional line $SC_k$ is $D(SC_k, Pc_{ji})$. The minimum value $W_m=\min(W_k|k=1, 2, 3)$ is obtained through a selection. That is, two-dimensional $SC_m$ is the image of the authentic three-dimensional point set $\{P_{mi}|1\leq i\leq n\}$ corresponding to two-dimensional line $SA_1$ imaged on third image 431. In other words, two-dimensional line $SA_1$ on first image 411, two-dimensional line $SB_j$ on second image 421, and two-dimensional line $SC_m$ of third image 431 are the projected image of the same authentic three-dimensional point set.

In one or more embodiments, the third camera may capture a colored texture of the surface of the object. The colored texture may be used, together with some or all of the steps described above, to determine the authentic three-dimensional point set. The third camera may capture the colored texture out-of-sync with the first camera capturing the first image and out-of-sync with the second camera capturing the second image. For example, the third camera may capture the colored texture before or after the first camera and the second camera synchronously capture the first image and the second image, respectively.

Figure 5:
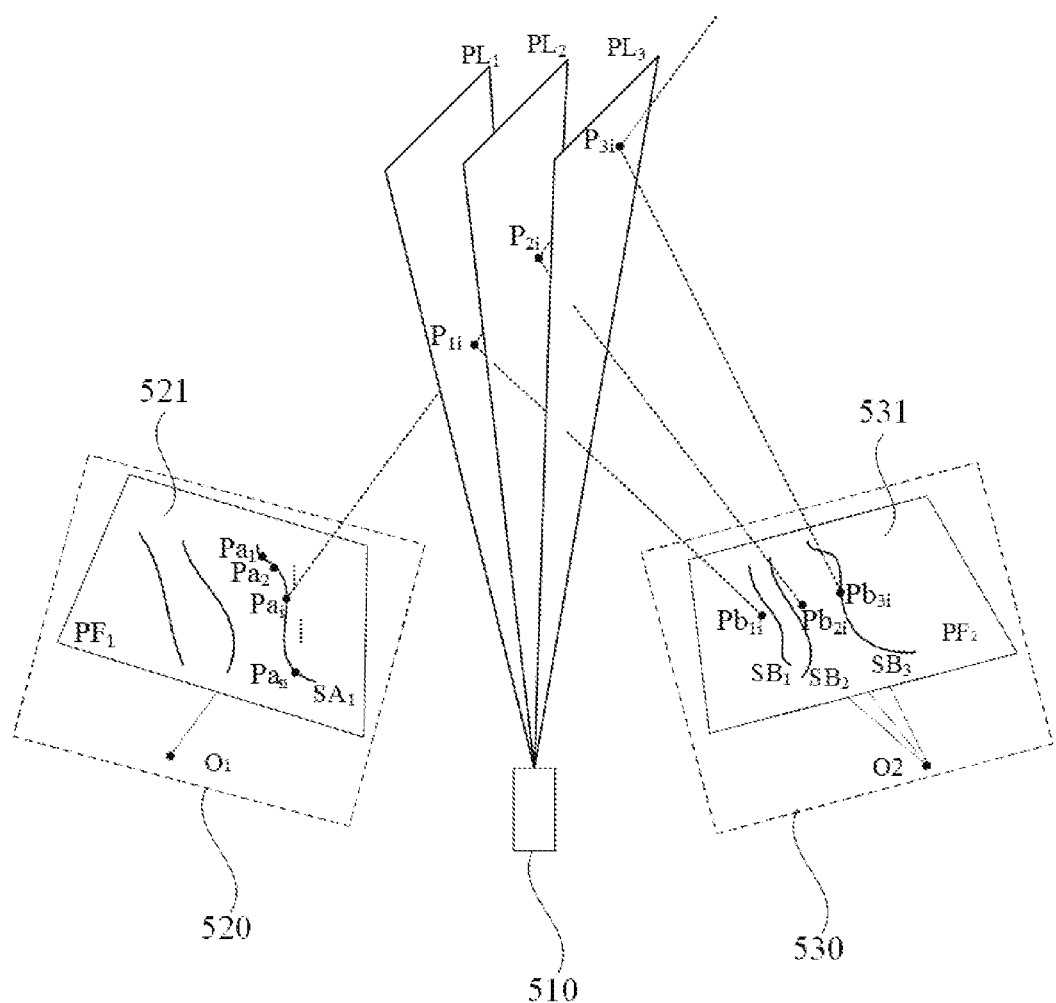
FIG. 5 is a schematic diagram of a method for obtaining an authentic three-dimensional point set according to the third embodiment of the present invention.

FIG. 5 is a schematic diagram of a method for obtaining an authentic three-dimensional point set according to the third embodiment of the present invention. The schematic diagram contains pattern projector 510, first camera 520, first image 521, second camera 530, and second image 531. Pattern projector 510 projects three light planes $PL_1$, $PL_2$ and $PL_3$. The two-dimensional image captured by first camera 520 is first image 521. The two-dimensional image captured by second camera 530 is second image 531. First image 521 captured by first camera 520 is imaged on a photosensitive element plane $PF_1$. Second image 531 captured by second camera 530 is imaged on a photosensitive element plane $PF_2$. $O_1$ and $O_2$ are the photocenters of first camera 520 and second camera 530 respectively. The internal and external parameters of the camera are known.

The specific method is as follows.

5.1, The two-dimensional point set $\{Pa_i|1\leq i\leq n\}$ on the two-dimensional line $SA_1$ on first image 521 is obtained according to step S2. Based on the triangulation principle, the extension line of the connection lines between the two-dimensional set and the photocenter $O_1$ of first camera 520 intersects with the three light planes $PL_1$, $PL_2$ and $PL_3$ at $\{\{P_{1i}|1\leq i\leq n\}, \{P_{2i}|1\leq i\leq n\}, \{P_{3i}|1\leq i\leq n\}\}$ which are the candidate three-dimensional point sets.

5.2 The Each point in the candidate three-dimensional point set is connected to the photocenter $O_2$ of second camera 530 respectively, and the connection lines intersect with photosensitive element plane $PF_2$ of second camera 530 at point $\{\{Pb_{1i}|1\leq i\leq n\}, \{Pb_{2i}|1\leq i\leq n\}, \{Pb_{3i}|1\leq i\leq n\}\}$. The location relationships between each subset in the intersection point set and the three two-dimensional lines $SB_1$, $SB_2$, $SB_3$ on second image 531 are recorded. A sum of distances between each point in the sub-set and a certain two-dimensional line $SB_k$ is used as a criterion for the selection:

$$W_k = \sum_{i=1}^{n} (D(SB_k, Pb_{ji})).$$

A candidate three-dimensional point set of the point set $\{Pa_i|1\leq i\leq n\}$ of a two-dimensional line $SA_1$ on first image 521 associated with light plane $PL_j$ is $\{P_{ji}|1\leq i\leq n\}$. The distance from the point set $\{Pb_{ji}|1\leq i\leq n\}$ of second image 531 associated with the light plane $PL_j$ to a two-dimensional line $SB_k$ is $D(SB_k, Pb_{ji})$. A minimum value $W_m$=min ($W_k$|k=1, 2, 3) is obtained by a selection. That is, $SB_m$ is determined as the line corresponding to the light plane $PL_j$ imaged on second camera 530. In other words, the three-dimensional point set $\{P_{ji}|1\leq i\leq n\}$ on the light plane $PL_j$ is an authentic three-dimensional point set corresponding to two-dimensional line $SA_1$ on first image 521. Also, the authentic three-dimensional point set of the light plane PLj projected on the surface of object 100 is imaged as the two-dimensional line $SA_1$ on first camera 520, and as two-dimensional line $SB_m$ on second camera 530.

Since the three-dimensional sensor system employs the projection of a plurality of linear patterns, the efficiency of point-determining is several times as much of the traditional single line scanning. The scanning speed is significantly improved.

A three-dimensional data acquisition method according to the embodiment of the present invention includes the following steps.

Step 101, at least two linear patterns are projected by a pattern projector.

Preferably, the at least two linear patterns can be projected by one pattern projector or synchronously projected by a plurality of pattern projectors. The linear pattern is a straight line or a curve line. The pattern projector includes a linear laser and a DOE beam splitting element. The linear laser produces a plurality of laser line segments through the DOE beam splitting element.

Preferably, the pattern projector can be a projector. The projector directly projects at least two linear patterns.

Step 102, at least two cameras synchronously capture the two-dimensional images.

Step 103, a two-dimensional line set of a linear projection on a surface of a scanned object on a two-dimensional image is extracted.

Preferably, the step of extracting the two-dimensional line set on a two-dimensional image of a linear projection on a surface of a scanned object specifically includes the following steps. A distortion correction is performed on the two-dimensional image according to an internal parameter of the camera corresponding to the two-dimensional image. A connected region of a line contour in a corrected image is extracted according to a pixel gray-level difference. The two-dimensional line set of a highlight center with a sub-pixel level is calculated according to a gray-level centroid of the connected region.

Step 104, a candidate three-dimensional point set is generated based on the two-dimensional line set.

Step 105, an authentic three-dimensional point set that correctly matches with a projection contour line on the surface of the object is selected from the candidate three-dimensional point set.

Specifically, step 104 and 105 can be realized through the three methods described hereinafter.

The first method is that the two-dimensional point data are extracted from the two-dimensional line sets of at least two synchronous two-dimensional images respectively. The candidate three-dimensional point set is calculated according to the principles of triangulation and epipolar constraints based on a correlation between the spatial location of the cameras. Whether a point belongs to the authentic three-dimensional point set is determined based on whether the point in the candidate three-dimensional point set is located in a certain three-dimensional light plane projected by the pattern projector. A selection is performed to obtain the authentic three-dimensional point set.

Preferably, the candidate three-dimensional point set includes a plurality of sub-sets. On the basis of distances between the sub-sets and the three-dimensional light plane, a sub-set having a minimum distance value is selected as the authentic three-dimensional point set.

The second method is that the two-dimensional point data are extracted from the two-dimensional line sets of two synchronous two-dimensional images respectively. The candidate three-dimensional point set is calculated according to the principles of triangulation and epipolar constraints based on a spatial location correlation between the two cameras corresponding to the two synchronous two-dimensional images. The two-dimensional images shot by a third camera or more cameras are used to perform a data verification on the candidate three-dimensional point set. The selection is performed to obtain the authentic three-dimensional point set.

Preferably, the candidate three-dimensional point set includes a plurality of sub-sets. A connection line between the subset and a photocenter of the third camera has an intersection point set with respect to the two-dimensional image shot by the third camera. On the basis of distances between the intersection point set and the two-dimensional line on the two-dimensional image shot by the third camera, a sub-set corresponding to a minimum distance value is selected as the authentic three-dimensional point set.

The third method is that the two-dimensional point data is extracted from the two-dimensional line set of an image shot by any camera. The candidate three-dimensional point set is obtained according to the principles of triangulation based on a correlation between the spatial location of a plurality of spatial light planes projected by the pattern projector and the camera. The candidate three-dimensional point set is verified with an image shot by at least another camera. A selection is performed to obtain the authentic three-dimensional point set.

Preferably, the candidate three-dimensional point set includes a plurality of sub-sets. A connection line between the subset and a photocenter of the at least one other camera has an intersection point set with respect to an image shot by the at least one other camera. On the basis of distances between the intersection point set and the two-dimensional line on the image shot by the at least one other camera, a sub-set corresponding to a minimum distance value is selected as the authentic three-dimensional point set.

It should be noted that the three-dimensional data acquisition method of the present embodiment and the three-dimensional sensor system in the foregoing embodiments are two aspects based on the same inventive concept. The implementation process of the method has been described in detail hereinbefore, so that a person of ordinary skill in the art can clearly understand the structure and the implementation process of the system described in the present embodiment according to the above description. To make the specification more compact, the details will not be repeated herein.

Various variations and modifications may be derived by those skilled in the art according to the above-mentioned technical solutions and concepts, and such variations and modifications should fall within the protective scope of the appended claims of the present invention.

What is claimed is:

1. A three-dimensional sensor system comprising:
    at least one pattern projector;
    a first camera, a second camera, and a third camera; and
    a processor,
    wherein the at least one pattern projector projects at least two linear patterns simultaneously on a surface of an object,
    wherein the first camera, the second camera, and the third camera synchronously capture a first two-dimensional image of the object, a second two-dimensional image of the object, and a third two-dimensional image of the object, respectively,
    wherein the processor extracts a first set of two-dimensional lines and a second set of two-dimensional lines from the at least two linear patterns on the first two-dimensional image and the second two-dimensional image, respectively,
    wherein the processor generates a candidate set of three-dimensional points from the first set of two-dimensional lines and the second set of two-dimensional lines, and
    wherein the processor selects, from the candidate set of three-dimensional points, an authentic set of three-dimensional points that matches a projection contour line of the object surface by:
        performing data verification on the candidate set of three-dimensional points using the third two-dimensional image, and
        filtering the candidate set of three-dimensional points to obtain the authentic set of three-dimensional points.

2. The three-dimensional sensor system of claim 1, wherein the processor generates the candidate set of three-dimensional points by:
    extracting two-dimensional point data from the first set of two-dimensional lines and the second set of two-dimensional lines, and
    calculating the candidate set of three-dimensional points using a spatial relationship between the first camera and the second camera and according to a trigonometry principle and an epipolar constraint principle.

3. The three-dimensional sensor system of claim 1,
    wherein the candidate set of three-dimensional points comprises a plurality of subsets;
    wherein a set of intersection points is formed by intersection points between lines connecting the subsets to an optical center of the third camera and the third two-dimensional image; and
    wherein the processor selects, from the plurality of subsets and based on distance values from the set of intersection points to the third two-dimensional image, the authentic set of three-dimensional points which is a subset corresponding to a minimum distance value.

4. The three-dimensional sensor system of claim 1,
    wherein the third camera captures a colored texture of the object surface out of sync with the first camera and the second camera.

5. The three-dimensional sensor system of claim 1,
    wherein the linear patterns are projected by one of the pattern projectors, or are simultaneously projected by a plurality of pattern projectors; and
    wherein the linear patterns are straight lines or curve lines.

6. The three-dimensional sensor system of claim 1, wherein
    the at least one pattern projector comprises a linear laser and a diffractive optical element (DOE) beam splitting element, the linear laser splitting a plurality of laser line segments using the DOE beam splitting element.

7. The three-dimensional sensor system of claim 1, further comprising a synchronous trigger,
    wherein the synchronous trigger triggers the cameras and the at least one pattern projector to work synchronously.

8. A three-dimensional sensor system comprising:
    at least one pattern projector;
    a first camera and a second camera; and
    a processor,
    wherein the at least one pattern projector projects at least two linear patterns simultaneously on a surface of an object;
    wherein the first camera and the second camera synchronously capture a first two-dimensional image of the object and a second two-dimensional image of the object, respectively;
    wherein the processor extracts a first set of two-dimensional lines and a second set of two-dimensional lines, from the at least two linear patterns on the first two-dimensional image and the second two-dimensional image, respectively;
    wherein the processor generates a candidate set of three-dimensional points from the first set of two-dimensional lines; and
    wherein the processor selects, from the candidate set of three-dimensional points, an authentic set of three-dimensional points that matches with a projection contour line of the object surface by:
        comparing the candidate set of three-dimensional points and the second two-dimensional image, and
        filtering the candidate set of three-dimensional points to obtain the authentic set of three-dimensional points.

9. The three-dimensional sensor system of claim 8, wherein the processor generates the candidate set of three-dimensional points by:
    extracting two-dimensional point data from the set of two-dimensional lines of the first two-dimensional image; and
    calculating, using a spatial relationship between a plurality of spatial light planes projected by the at least one pattern projector and the first camera, the candidate set of three-dimensional points according to a trigonometry principle.

10. The three-dimensional sensor system of claim 8,
    wherein the candidate set of three-dimensional points comprises a plurality of subsets;
    wherein a set of intersection points is formed by intersection points between lines connecting the subsets to an optical center of the second camera and the second two-dimensional image; and
    wherein the processor selects, from the plurality of subsets and based on distance values from the set of intersection points to the second set of two-dimensional lines, the authentic set of three-dimensional points which is a subset corresponding to a minimum distance value.

11. The three-dimensional sensor system of claim 8,
wherein the linear patterns are projected by one of the pattern projectors, or are simultaneously projected by a plurality of pattern projectors; and
wherein the linear patterns are straight lines or curve lines.

12. The three-dimensional sensor system of claim 8, wherein the at least one pattern projector comprises a linear laser and a diffractive optical element (DOE) beam splitting element, the linear laser splitting a plurality of laser line segments using the DOE beam splitting element.

13. The three-dimensional sensor system of claim 8, further comprising a synchronous trigger,
wherein the synchronous trigger triggers the first and the second cameras and the at least one pattern projector to work synchronously.

14. A three-dimensional data acquisition method, comprising:
simultaneously projecting, by a pattern projector, at least two linear patterns on a surface of an object;
synchronously capturing a first two-dimensional image of the object, a second two-dimensional image of the object, and a third two-dimensional image of the object by a first camera, a second camera, and a third camera, respectively;
extracting, by a processor, a first set of two-dimensional lines and a second set of two-dimensional lines from the at least two linear patterns on the first two-dimensional images and the second two-dimensional images, respectively;
generating, by the processor, a candidate set of three-dimensional points from the first set of two-dimensional lines and the second set of two-dimensional lines,
selecting, from the candidate set of three-dimensional points, an authentic set of three-dimensional points that matches with a projection contour line of the object surface by:
performing data verification on the candidate set of three-dimensional points using the third two-dimensional image; and
filtering the candidate set of three-dimensional points to obtain the authentic set of three-dimensional points.

15. The three-dimensional data acquisition method of claim 14, wherein the processor generates the candidate set of three-dimensional points by:
extracting two-dimensional point data from the first set of two-dimensional lines and the second set of two-dimensional lines; and
calculating the candidate set of three-dimensional points using a spatial relationship between the first camera and the second camera and according to a trigonometry principle and an epipolar constraint principle.

16. The three-dimensional data acquisition method of claim 14,
wherein the candidate set of three-dimensional points comprises a plurality of subsets;
wherein a set of intersection points is formed by intersection points between lines connecting the subsets to an optical center of the third camera and the third two-dimensional image; and
wherein the processor selects, from the plurality of subsets and based on distance values from the set of intersection points to the third two-dimensional image, the authentic set of three-dimensional points which is a subset corresponding to a minimum distance value.

17. The three-dimensional data acquisition method of claim 14,
wherein the third camera captures a colored texture of the object surface out of sync with the first camera and the second camera.

18. A three-dimensional data acquisition method, comprising:
simultaneously projecting, by at least one pattern projector, at least two linear patterns on a surface of an object;
synchronously capturing a first two-dimensional image of the object and a second two-dimensional image of the object by a first camera and a second camera, respectively;
extracting, by a processor, a first set of two-dimensional lines and a second set of two-dimensional lines, from the at least two linear patterns on the first two-dimensional images and the second two-dimensional images, respectively;
generating, by a processor, a candidate set of three-dimensional points from the first set of two-dimensional lines; and
selecting, from the candidate set of three-dimensional points, an authentic set of three-dimensional points that matches with a projection contour line of the object surface by:
comparing the candidate set of three-dimensional points and the second two-dimensional image; and
filtering the candidate set of three-dimensional points to obtain the authentic set of three-dimensional points.

19. The three-dimensional data acquisition method of claim 18, wherein the processor generates the candidate set of three-dimensional points by:
extracting two-dimensional point data from the first set of two-dimensional lines; and
calculating, using a spatial relationship between a plurality of spatial light planes projected by the at least one pattern projector and the first camera, the candidate set of three-dimensional points according to a trigonometry principle.

20. The three-dimensional data acquisition method of claim 18,
wherein the candidate set of three-dimensional points comprises a plurality of subsets;
wherein a set of intersection points is formed by intersection points between lines connecting the subsets to an optical center of the second camera and the second two-dimensional image; and
wherein the processor selects, from the plurality of subsets and based on distance values from the set of intersection points to the second set of two-dimensional lines, the authentic set of three-dimensional points which is a subset corresponding to a minimum distance value.

* * * * *